US012485867B2

(12) United States Patent
Subramanian (10) Patent No.: US 12,485,867 B2
(45) Date of Patent: Dec. 2, 2025

(54) METHOD FOR UPDATING A CONFIGURATION IN A BRAKING ARRANGEMENT

(71) Applicant: Volvo Truck Corporation, Gothenburg (SE)

(72) Inventor: Chidambaram Subramanian, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 179 days.

(21) Appl. No.: 18/354,629

(22) Filed: Jul. 18, 2023

(65) Prior Publication Data
US 2024/0051511 A1    Feb. 15, 2024

(30) Foreign Application Priority Data
Aug. 11, 2022    (EP) .................................... 22189974

(51) Int. Cl.
*B60T 17/22*    (2006.01)
(52) U.S. Cl.
CPC ........... *B60T 17/22* (2013.01); *B60T 2220/04* (2013.01); *B60T 2240/00* (2013.01); *B60T 2250/00* (2013.01); *B60T 2250/04* (2013.01); *B60T 2270/406* (2013.01); *B60T 2270/88* (2013.01)
(58) Field of Classification Search
CPC .. B60T 17/22; B60T 2220/04; B60T 2240/00; B60T 2250/00; B60T 2250/04; B60T 2270/406; B60T 2270/88; B60T 8/171
See application file for complete search history.

(56) References Cited

U.S. PATENT DOCUMENTS

| | | | |
|---|---|---|---|
| 3,363,697 A | 1/1968 | Speno | |
| 2018/0134161 A1* | 5/2018 | Gaither | B60L 7/26 |
| 2018/0201243 A1* | 7/2018 | Pennala | B60T 13/66 |
| 2019/0100218 A1* | 4/2019 | Kim | B60T 13/686 |
| 2019/0168722 A1* | 6/2019 | Schroeder | B60T 7/22 |
| 2019/0389442 A1* | 12/2019 | Kim | B60T 7/12 |
| 2021/0331655 A1 | 10/2021 | So | |
| 2023/0026361 A1* | 1/2023 | Subramanian | B60T 8/171 |
| 2023/0303050 A1* | 9/2023 | Toth | F16D 66/00 |
| 2025/0110230 A1* | 4/2025 | Manela | G01S 13/89 |

OTHER PUBLICATIONS

Extended European Search Report for European Patent Application No. 22189974.3, mailed Feb. 3, 2023, 9 pages.

* cited by examiner

*Primary Examiner* — Thomas Ingram
(74) *Attorney, Agent, or Firm* — Withrow & Terranova, PLLC (57) ABSTRACT

A method for updating a configuration of a braking arrangement in a vehicle is provided. The method comprises obtaining sensor data indicative of a status of the vehicle and/or of the braking arrangement during at least a part of a braking operation performed by the braking arrangement. The method further comprises predicting, based on the obtained sensor data, at least one component that are part of the braking arrangement. The method further comprises in response to detecting that the configuration of the braking arrangement does not comply with the at least one component, updating the configuration to be based on the at least one component.

15 Claims, 4 Drawing Sheets

METHOD FOR UPDATING A CONFIGURATION IN A BRAKING ARRANGEMENT

RELATED APPLICATIONS

The present application claims priority to European Patent Application No. 22189974.3, filed on Aug. 11, 2022, and entitled "METHOD FOR UPDATING A CONFIGURATION IN A BRAKING ARRANGEMENT," which is incorporated herein by reference in its entirety.

TECHNICAL FIELD

The invention relates to a method for updating a configuration of a braking arrangement in a vehicle. The invention further relates to a control unit, a vehicle, a computer program and a computer program medium.

The invention can be applied in heavy-duty vehicles, such as trucks, buses and construction equipment. The invention can also be applied in any other suitable vehicle such as a car.

BACKGROUND

An Electronic Braking System (EBS) includes a configuration of a vast amount of configurable brake parameters, sometimes more than 1000 brake parameters. One of the parameters is called a brake factor parameter which is defined as a torque generated per unit of brake pressure from a brake. The unit of the brake factor is typically Newton meter (Nm)/Bar. The brake factor parameter drastically changes between different brakes and use in braking arrangements, for example, a small brake chamber such as a T16 Bendix needs a significantly different brake factor parameter than a T30 drum brake.

When a vehicle such as a truck is built in a production plant, the configurable brake parameters including the brake factor parameter are set according to the build order, i.e., depending on which components are included in the brake arrangement. The configurable brake parameters including the brake factor parameter may be set based on each specific component but may also be set based on a combination of components due to their known interaction when decelerating the vehicle.

After some time, e.g., due to component malfunction or degradation, the vehicle may be retrofitted with a new braking component. However, as the configurable brake parameters, including the brake factor is set for the braking components installed during manufacturing, the configurable brake parameters are likely to be incorrect for the new braking component. There is no automatic way of updating the configurable brake parameters and thus they need to be manually updated. Manually updating the configurable brake parameters is a difficult task which requires expert knowledge of the braking components and the vehicle. Furthermore, updating the configurable brake parameters may be easy to forget and/or an owner or user of the vehicle may not know that there is a need to reconfigure the configurable brake parameters. Hence, vehicles with retrofitted braking components may risk using incorrect configurations for the vehicle's braking arrangement. Using incorrect configurations for the vehicle's braking arrangement may lead to a reduced brake performance in the vehicle. For example, when decelerating the vehicle and a brake factor parameter is set to an incorrect value, a brake of the braking arrangement may apply too much or too little brake pressure which leads to a reduced brake performance of the vehicle. This may be since the vehicle may decelerate too quickly or slowly, and/or that other brakes of the vehicle may need to be used in a disproportionate manner.

Hence, there is a desire to improve the brake performance of vehicles.

SUMMARY

An object of the invention is to improve a brake performance of a vehicle.

According to a first aspect, the above object is achieved by a method according to claim 1. Hence, there is provided a method for updating a configuration of a braking arrangement in a vehicle. The method comprises:
  obtaining sensor data indicative of a status of the vehicle and/or of the braking arrangement during at least a part of a braking operation performed by the braking arrangement,
  based on the obtained sensor data, predicting at least one component that are part of the braking arrangement,
  in response to detecting that the configuration of the braking arrangement does not comply with the at least one component, updating the configuration to be based on the at least one component.

Since the at least one component is predicted using the obtained sensor data, it is possible to detect whether or not the configuration of the braking arrangement complies with the predicted at least one component. In other words, it can be detected whether the configuration is correct for the braking arrangement comprising the at least one component. When detecting that the configuration of the braking arrangement does not comply with the at least one component, i.e., the braking arrangement is configured incorrectly, it is possible to update the configuration to be based on the at least one component. In this way, an automated manner of updating a configuration of the braking arrangement is achieved. Thus, it is ensured that the braking arrangement is updated with the correct braking configuration which leads to an improved brake performance of the vehicle.

Optionally, the sensor data indicates any one or more out of:
  at least one temperature measurement of at least one brake of the braking arrangement,
  at least one ambient temperature of the braking arrangement and/or of the vehicle,
  a brake pedal position,
  a control line pressure,
  a delivery line pressure,
  a rotational speed of at least one wheel,
  a speed of the vehicle,
  a rolling radius of at least one wheel, and
  a deceleration measurement of the vehicle.

As a wide range of sensor data may be used, it is ensured that the at least one component may be accurately predicted in a flexible manner, e.g., using any one or more suitable available sensor data. When the prediction is accurate, it follows that the updated configuration is accurate which thereby results in an improved brake performance of the vehicle.

Optionally, predicting the at least one component comprises predicting any one or more out of:
  at least one model of the at least one component,
  at least one identifier of the at least one component,
  at least one type of the at least one component, and
  at least one manufacturer of the at least one component.

Predicting any one or more out of the model, identifier, type, and manufacturer, may improve the accuracy of predicting the at least one component. This is since using this extended information may narrow down a selection of components that may be the at least one component. When the prediction is accurate, it follows that the updated configuration is accurate which thereby results in an improved brake performance of the vehicle.

Optionally, the configuration comprises a brake factor parameter for at least one wheel, and wherein the brake factor parameter is indicative of a torque generated per unit of brake pressure.

In this way, the braking arrangement is updated with an accurate brake factor parameter which thus ensures an improved brake performance of the vehicle.

Optionally, updating the configuration comprises obtaining a new configuration or obtaining an adjustment to the configuration from a server.

Optionally, detecting that the configuration of the braking arrangement does not comply with the at least one component comprises determining that the configuration is not configured for the at least one component.

When it is determined that the configuration of the braking arrangement is not configured for the at least one component, it is ensured that an update of the configuration is needed. The updated configuration will thus improve the configuration compliance with the at least one component and thereby improve brake performance of the vehicle.

Optionally, predicting the at least one component comprises determining a confidence level for the predicted the at least one component, and wherein detecting that the configuration of the braking arrangement does not comply with the at least one component comprises determining that the confidence level exceeds a threshold.

In this way, detection of that the configuration of the braking arrangement does not comply with the at least one component is only when the prediction is determined to be accurate. When the prediction is accurate, it follows that the updated configuration is accurate which thereby results in an improved brake performance of the vehicle.

Optionally, predicting the at least one component is performed by using a trained machine learning model and using the obtained sensor data as input.

Using the trained machine learning model, it is possible to first obtain training data of at least one training vehicle that may be different from said vehicle. The training data may comprise a use of multiple different components, in multiple different braking arrangements and obtain the respective sensor data of using said components in said braking arrangements. For each of the braking arrangements used for training, a respective ground truth configuration may be obtained, and thus, the respective components, arrangements, sensor data, and configurations may be used to train the trained machine learning model to accurately predict the at least one component from different components. This is possible as each component and/or combination of components will affect at least some sensor data, and the trained machine learning model may therefore be capable of detecting which components, individually or in combination, affect or generate some type of sensor data. The at least one component can therefore be predicted as it is possible for the trained machine learning model to map the obtained sensor data used as input to the at least one component as similar sensor data have been processed when training the trained machine learning model as part of the training data.

Optionally, the trained machine learning model is trained using real-world data and/or simulated sensor data of at least one training vehicle comprising the at least one component.

As the at least one component is comprised in the at least one training vehicle, it is possible to get accurate real-world data and/or simulated sensor data of the at least one training vehicle when operating using the at least one component. In this way, a more accurate prediction of the at least one component that are part of the braking arrangement may be achieved. As the prediction is more accurate, the updated configuration is more accurate which thereby results in an improved brake performance of the vehicle.

Optionally, predicting the at least one component that are part of the braking arrangement is at least partly triggered periodically and/or by any one or more out of:
receiving a signal from a server,
obtaining input from a user, and
starting the vehicle.

In this way, it is ensured that the vehicle updates the configuration of the braking arrangement in a quick manner and thereby reduces a time which the vehicle operates using a configuration which does not comply with the at least one component.

Optionally, the sensor data is obtained during at least one complete brake cycle of the braking arrangement.

In this way, a more accurate prediction of the at least one component that are part of the braking arrangement is achieved. This is since the complete brake cycle indicates a full range of use of the braking arrangement. As the prediction is more accurate, the updated configuration is more accurate which thereby results in an improved brake performance of the vehicle.

According to a second aspect, there is provided a control unit configured to perform the method according to the first aspect.

According to a third aspect, there is provided a vehicle comprising a braking arrangement and the control unit according to the second aspect.

According to a fourth aspect, there is provided a computer program comprising program code means for performing the method according to the first aspect, when said program is run on a computer.

According to a fifth aspect, there is provided a computer program medium carrying a computer program comprising program code means for performing the method according to the first aspect, when said program is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
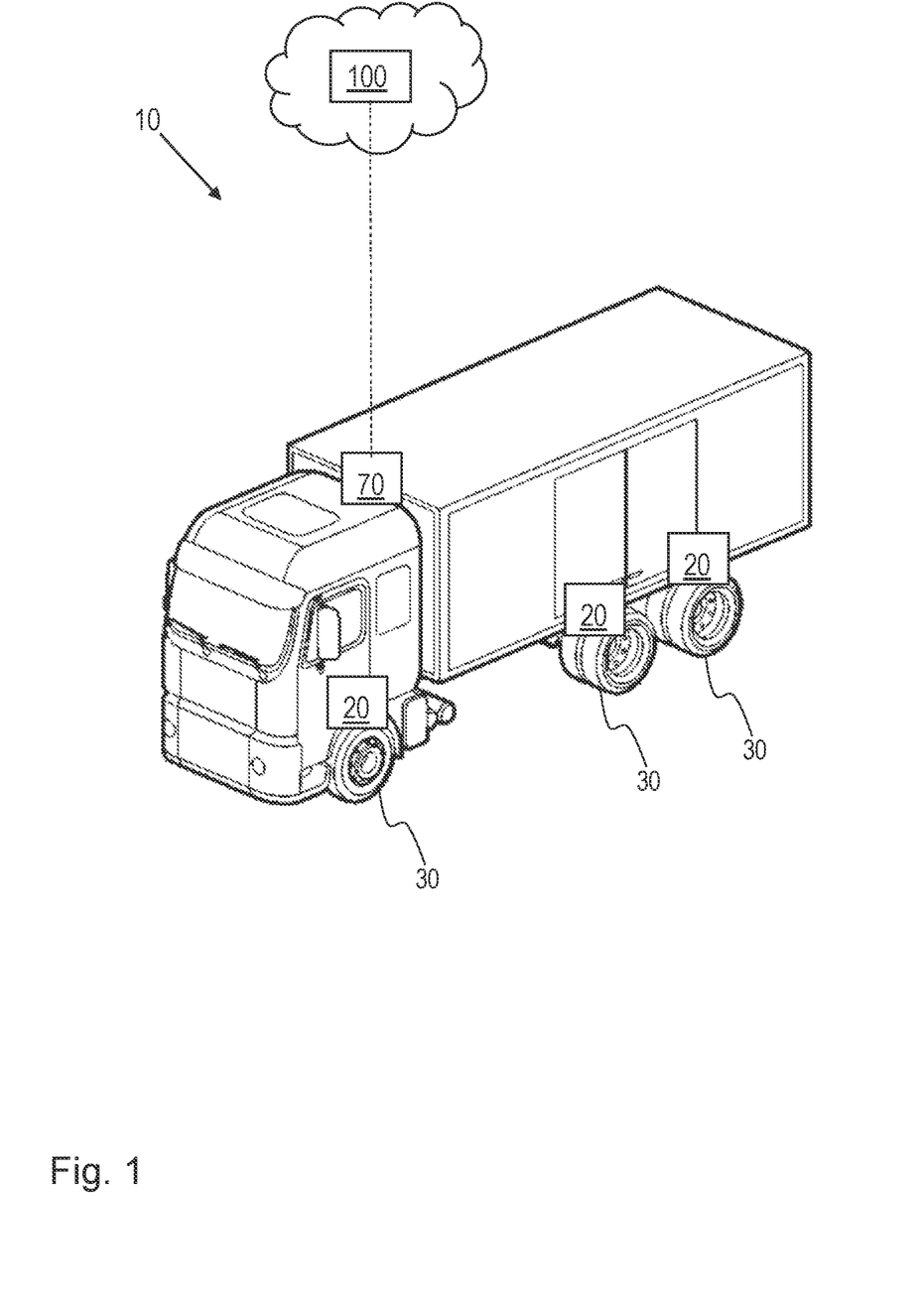
FIG. 1 is a schematic overview of a vehicle in accordance with embodiments herein.

FIG. 1 illustrates a schematic overview of a vehicle 10. Although illustrated as a truck in FIG. 1, embodiments herein are applicable to any suitable vehicle e.g., any of a car, a truck, a bus, or any heavy-duty vehicle. The vehicle 10 may be manually operated by a user, e.g., a driver. The vehicle may also be operated remotely and/or may be at least partly autonomous.

The vehicle 10 comprises a braking arrangement 20. The braking arrangement 20 may be arranged for decelerating and braking the vehicle 10. The braking arrangement 20 may be arranged with any one or more wheels 30 of the vehicle 10. The braking arrangement 20 may comprise at least one brake with respective brake components per wheel 30. The braking arrangement 20 may comprise a set of components, for example any one or more out of:
- a service brake,
- a brake chamber,
- a brake disc,
- a brake rotor,
- a caliper,
- a brake shoe,
- a brake drum,
- a slack adjuster, and
- a brake cam.

The vehicle 10 may further comprise a set of sensors (not shown in FIG. 1). The set of sensors may be able to obtain sensor data indicative of a status of the vehicle 10 and/or a status of the braking arrangement 20 during at least a part of a braking operation performed by the braking arrangement 20.

The set of sensors may comprise any one or more suitable sensors, e.g., one or more out of:
- at least one temperature sensor, e.g., any suitable thermometer, thermoscanner, thermocouple, etc.
- at least one brake pedal position sensor, e.g., any suitable sensor for determining the position of the brake pedal,
- at least one control line pressure sensor,
- at least one delivery line pressure sensor,
- at least one wheel speed sensor and/or speedometer, and
- at least one deceleration sensor.

A control line pressure as used herein is a pressure to a brake control valve, which control line pressure controls what brake pressure is delivered to at least one wheel 30 of the vehicle 10. A delivery line pressure as used herein is a corresponding pressure supplied to the brake control valve, which pressure is used for applying brake pressure to the at least one wheel 30 of the vehicle 10, as controlled by the control line pressure.

Hence, as an example, the set of sensors may be able to obtain sensor data indicative of any one or more out of: at least one temperature measurement of at least one brake of the braking arrangement 20, at least one ambient temperature of the braking arrangement 20 and/or of the vehicle 10, a brake pedal position, a control line pressure, a delivery line pressure, a rotational speed of at least one wheel, a speed of the vehicle 10, a rolling radius of at least one wheel 30, and a deceleration measurement of the vehicle 10.

Any one or more out of the set of sensors may be realized using any suitable manner, e.g., by direct measurement and/or by indirect measurements and deriving the sensor data. For example, the deceleration sensor may be represented by an Inertial Measurement Unit (IMU) and/or may be represented by several sensors which together form a sensor data set that is used to derive a deceleration of the vehicle 10. For example, a Global Navigation Satellite System (GNSS) such as a Global Positioning System (GPS) sensor may be used for determining a position and differentiating twice. Additionally or alternatively, it may be possible to measure tire friction forces in a longitudinal direction, where the sum of the tire friction forces divided by a mass, of the vehicle 10, is the acceleration, i.e., using Newton's second law of motion, stating that a Force F is equivalent to a mass M times acceleration a, $F=M*a$.

The braking arrangement 20 may be configured to comply with the set of components in the braking arrangement 20, e.g., as initially arranged in the braking arrangement 20 when manufacturing the vehicle 10.

The set of components in the braking arrangement 20 may independently and/or in combination with any one or more components out of the set of components affect how the braking arrangement shall be configured, e.g., which one or more braking parameters need to be configured to which values. As an example, a brake factor parameter for the braking arrangement 20 may be part of the configuration of the braking arrangement 20. The brake factor may indicate how much torque at least part of the braking arrangement 20 will be able to apply for a certain brake pressure, e.g., for a brake of a particular wheel out of the wheels 30.

If a component in the set of components is replaced, the configuration of the braking arrangement 20 need to be reconfigured or there will be a risk of using an incorrect configuration for the braking arrangement 20. If the configuration is not updated, the incorrect configuration of the braking arrangement 20 may cause a brake of the braking arrangement 20 to apply too much or too little brake pressure on one or more wheels which cause a performance degradation of the braking arrangement 20. This is since brakes of the braking arrangement 20 may then be used in a disproportionate manner and/or may result in a different deceleration, e.g., faster or slower deceleration, of the vehicle 10 than that of a desired and/or expected deceleration.

Other problems with an incorrectly configured braking arrangement 20 may relate to incorrect use of anti-compounding functions and/or brake temperature estimation.

Anti-compounding relates to a function for preventing that service brakes and park brakes are not to be applied at the same time. As wheel end brakes, e.g., of the of the braking arrangement 20, may be designed to withstand a limit of brake force, for example 10 kN force. It may further be possible to achieve 6 kN using parking brakes and a full brake pedal would additionally provide 9 kN. In other words, if both parking brakes and full brake pedal braking are applied at the same time, then you will exceed the limit of brake force tolerable for the braking arrangement 20. In this example, the braking arrangement 20 would be applied with 15 kN of force which is 5 kN more than the design's safe limit and would risk breaking or at least damaging the wheel ends, e.g., of the one or more wheels 30. To prevent this, the anti-compounding function reduces service brake pressure whenever parking brakes are applied to a certain pressure value, to ensure you do not exceed the max safe limit of the braking arrangement 20. The max safe limit and/or other parameters for anti-compounding may depend on the components of the braking arrangement 20, brake type, and/or based on which is the braking arrangement 20 manufacturer.

Wheel ends overheating and thereby losing its braking functionality is a common problem in commercial trucks. To avoid overheating, runaway ramps may be used. Brake temperature estimation is typically performed using one or more physics-based equations to estimate what would be the temperature in the braking arrangement. Additionally or alternatively, brake temperature sensors are used. The equations used for estimating temperature may have more than 50 coefficients which are unique for different wheel ends depending on the corresponding braking arrangement.

Therefore, for brake temperature estimation to be accurate for the vehicle 10, parameters for the braking arrangement need to be accurate.

Hence, when replacing any component in the braking arrangement 20, i.e., in the set of components, embodiments herein relate to updating the configuration of the braking arrangement 20. This is performed by predicting at least one component that are part of the braking arrangement and in response to detecting that the configuration of the braking arrangement 20 does not comply with the at least one component, updating the configuration to be based on the at least one component.

Embodiments herein may be performed by a control unit 70. The control unit 70 may be comprised in the vehicle 10, e.g., as part of the braking arrangement 20, but may also be comprised in any other suitable location communicatively connected with the braking arrangement 20 and/or the set of sensors. The control unit 70 may be an ECU.

To update the configuration of the braking arrangement 20 to be based on the at least one component, the control unit 70 may need to obtain a new configuration and/or an adjustment to a current configuration. The new configuration and/or the adjustment to the current configuration may for example be obtained from a server 100. The control unit 70 may be communicatively coupled with the server 100, e.g., using a wireless connection. The server 100 may be a remote server, e.g., part of a cloud service. As an alternative, the new configuration and/or the adjustment to the current configuration may also be obtained from a local storage medium, e.g., in the vehicle and/or in the control unit 70.

Figure 2:
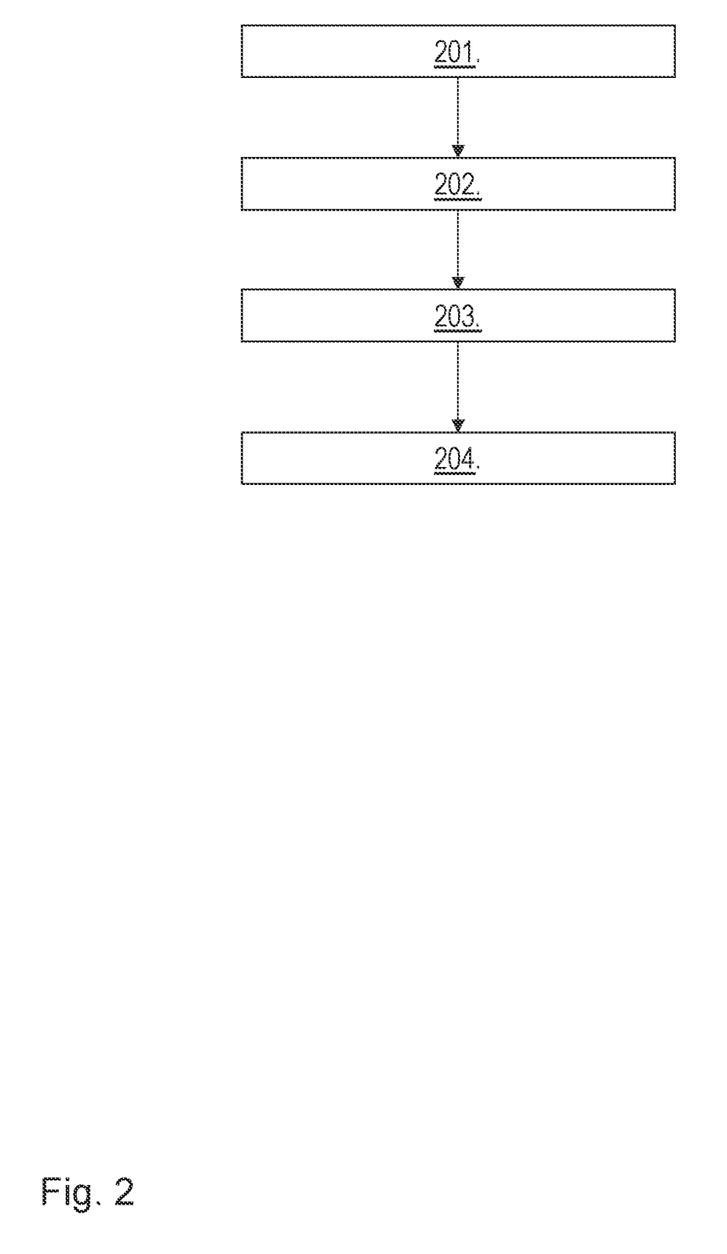
FIG. 2 is a flowchart of a method in accordance with embodiments herein.

FIG. 2 illustrates a method for updating a configuration of the braking arrangement 20 in the vehicle 10. The method may e.g., be performed by the control unit 70. The configuration may comprise a brake factor parameter e.g., for at least one wheel out of the wheels 30. The brake factor parameter may be indicative of a torque generated per unit of brake pressure. The method may comprise one or more of the following actions which actions may be taken in any suitable order.

Action 201

The method comprises obtaining sensor data indicative of a status of the vehicle 10 and/or of the braking arrangement 20 during at least a part of a braking operation performed by the braking arrangement 20. The sensor data may be obtained by the set of sensors as described with respect to FIG. 1.

In some embodiments, the sensor data indicates any one or more out of:
- at least one temperature measurement of at least one brake of the braking arrangement 20,
- at least one ambient temperature of the braking arrangement 20 and/or of the vehicle 10,
- a brake pedal position,
- a control line pressure,
- a delivery line pressure,
- a rotational speed of at least one wheel,
- a speed of the vehicle 10,
- a rolling radius of at least one wheel, and
- a deceleration measurement of the vehicle 10.

The sensor data may be obtained during braking/decelerating the vehicle 10. In some embodiments the sensor data is obtained during at least one complete brake cycle of the braking arrangement 20. The at least one complete brake cycle may comprise a time period ranging from starting braking the vehicle 10 until a deceleration of the vehicle 10 is ceased. Additionally or alternatively, the at least one complete brake cycle may comprise a time period ranging from starting braking the vehicle 10 until a complete standstill of the vehicle 10.

Action 202

The method comprises, based on the obtained sensor data, predicting at least one component that are part of the braking arrangement 20. The predicted at least one component may be a replaced component in the braking arrangement 20. In some embodiments, all components of the braking arrangement 20 are predicted.

In some embodiments predicting the at least one component further comprises predicting any one or more out of:
- at least one model of the at least one component,
- at least one identifier of the at least one component,
- at least one type of the at least one component, and
- at least one manufacturer of the at least one component.

In some embodiments, predicting the at least one component further comprises predicting a configuration, e.g., a brake factor, complying with the braking arrangement 20, i.e., including the at least one component.

In some embodiments, predicting the at least one component is performed by using a trained machine learning model and using the obtained sensor data as input. The trained machine learning model may comprise a neural network, e.g., artificial neural network, or any other suitable machine learning model, e.g., comprising and/or using any one or more out of the following methods and/or models: fine tree, gaussian Vector, ensemble bagged trees, support vector machines, deep neural network e.g. using a Levernberg-Marquardt method, a Bayesian regularization method, or a scaled conjugate method. When the trained machine learning model comprises a neural network, one or more number of hidden layers and/or neurons may be determined during training, and based on testing a performance, e.g., an accuracy, of the trained machine learning model.

In some embodiments the trained machine learning model is trained using real-world data and/or simulated sensor data of at least one training vehicle comprising the at least one component. For example, the at least one training vehicle may generate sensor data, e.g., as used in action 201, when driving using different components in a braking arrangement.

Obtaining training data for the trained machine learning model, i.e., the real-world data and/or simulated sensor data, may be at least performed during braking/decelerating the at least one training vehicle. In some embodiments the training data may be, similar to obtaining the sensor data in action 201, obtained during at least one complete brake cycle of a braking arrangement of the at least one training vehicle.

In some embodiments, predicting the at least one component comprises determining a confidence level for the predicted the at least one component. In these embodiments, detecting that the configuration of the braking arrangement 20 does not comply with the at least one component comprises determining that the confidence level exceeds a threshold.

Action 203

The method comprises detecting that the configuration of the braking arrangement 20 does not comply with the at least one component. For example, the sensor data may indicate a different status of the vehicle and/or the braking arrangement 20 than what is expected from using the at least one component. In other words, it may be detected whether the configuration is correct for the braking arrangement comprising the at least one component. As an example, detecting that the configuration of the braking arrangement 20 does not comply with the at least one component may comprise detecting a change of a component in the braking arrangement 20, e.g., such that it is detected that the at least one component has replaced another component.

In some embodiments, detecting that the configuration of the braking arrangement 20 does not comply with the at least one component comprises determining that the configuration is not configured for the at least one component. In some embodiments, this may be performed by predicting an identifier of the at least one component, and checking whether the at least one component is part of the braking arrangement 20, e.g., by lookup in a stored table of components, e.g., stored in the control unit 70 or in any suitable storage medium. In some embodiments, the sensor data obtained in action 201 may indicate that there is at least one value that is unlikely or impossible to achieve using the at least one component in the braking arrangement 20. In these embodiments, values of the sensor data may be compared with one or more predetermined thresholds for the at least one component. In some of these embodiments, this means that the one or more predetermined thresholds need to be stored locally, e.g., stored in the control unit 70 or in any suitable storage medium, and/or obtained dynamically when needed, e.g., from the server 100. The one or more predetermined thresholds may for example be part of the trained machine learning model.

In some embodiments, predicting the at least one component that are part of the braking arrangement 20 is at least partly triggered periodically e.g., once a week or once a month, and/or by any one or more out of:
  receiving a signal from a server 100, e.g., the server 100 explicitly triggering a prediction of the at least one component and/or indicating newly available configurations for components that may be applicable to the braking arrangement 20,
  obtaining input from a user, e.g., a driver or a mechanic, and starting the vehicle 10.

Action 204

The method comprises, updating the configuration to be based on the at least one component. Updating the configuration to be based on the at least one component is performed in response to detecting that the configuration of the braking arrangement 20 does not comply with the at least one component, e.g., as in action 203. The updated configuration may comprise an updated brake factor parameter e.g., for at least one wheel out of the wheels 30 in the vehicle 10. The updated brake factor parameter may be indicative of a torque generated per unit of brake pressure. The updated configuration may additionally or alternatively comprise an updated max safe limit for anti-compounding, and/or any other one or more parameters for anti-compounding. The updated configuration may additionally or alternatively comprise one or more updated equations and/or one or more updated coefficients for estimating temperature in the braking arrangement 20. Furthermore, additionally or alternatively, any model relying on one or more brake parameters of the brake configuration may be updated.

In some embodiments, updating the configuration comprises obtaining a new configuration or obtaining an adjustment to the configuration from the server 100. For example, a request may be sent to the server indicating the at least one component and a reply may be sent back with the updated configuration and/or an instruction for how to adjust a current configuration. The server 100 may reply with a configuration for the at least one component.

In some embodiments, the request may indicate the current configuration of the braking arrangement 20 and/or an identifier of the vehicle 10 and/or all components of the braking arrangement 20. The server 100 may then provide a suitable configuration which comply with the components of the braking arrangement 20. In some embodiments, the server 100 may track what components were previously installed in the braking arrangement 20 and may use this information to render a new configuration. In some of these embodiments, only the at least one component needs to be provided in the request.

In some embodiments, the request may indicate any one or more out of: the predicted at least one model of the at least one component, the predicted at least one identifier of the at least one component, the predicted at least one type of the at least one component, and the predicted at least one manufacturer of the at least one component. In some of these embodiments, the server 100 may, if not matching a configuration for the specific at least one component, determine a suitable configuration which is likely to be accurate for the at least one component.

Figure 3:
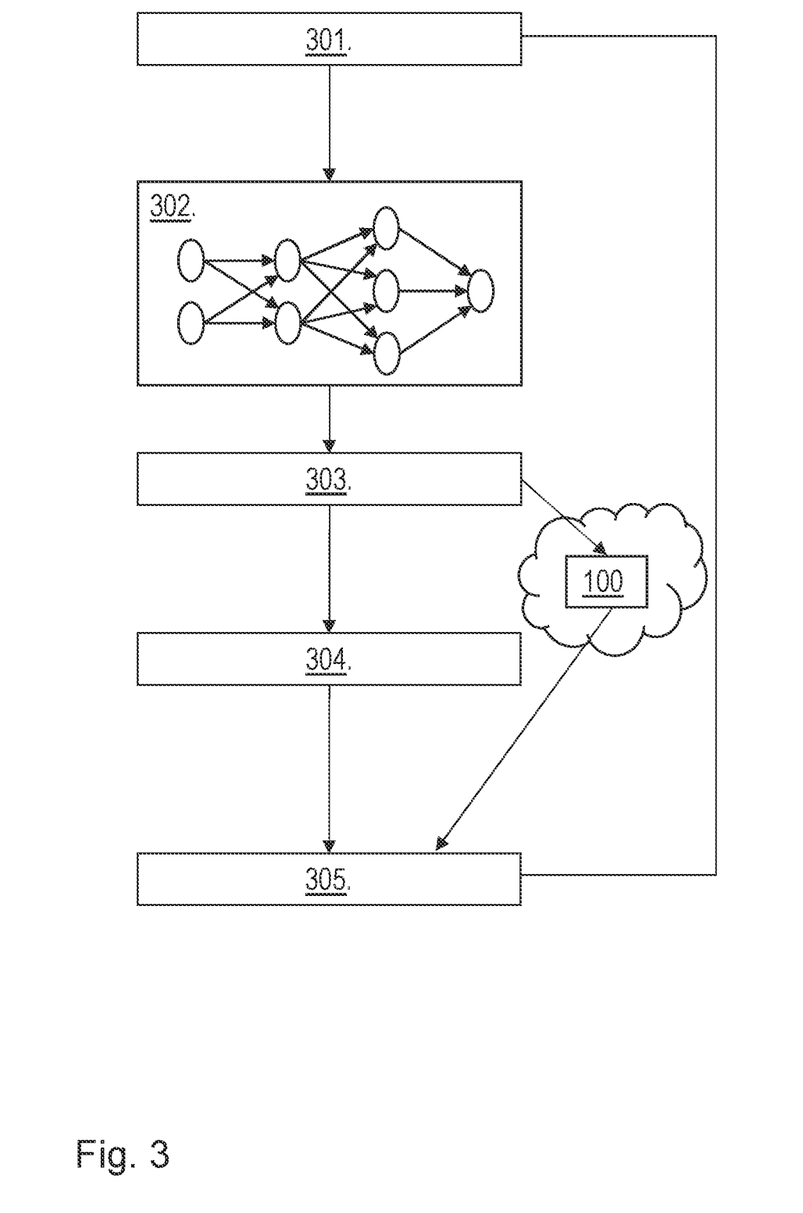
FIG. 3 is an example scenario in accordance with embodiments herein.

FIG. 3 illustrates an example scenario in accordance with embodiments herein. An input for the trained machine learning model is obtained 301, e.g., as in action 201. The input may for example comprise a vehicle speed of the vehicle 10, a wheel rotational speed of at least one wheel of the wheels 30, a load of the vehicle 10, a brake temperature of at least one brake in the braking arrangement 20, an ambient temperature in the braking arrangement 20, a control pressure of at least one brake in the braking arrangement 20, a deceleration of the vehicle 10.

The obtained input is fed 302 as input into the trained machine learning model. The trained machine learning model is in this example a neural network which is trained at least partly based on the same type of parameters as in the obtained input where the training data was generated using at least one training vehicle using different components and different configurations.

Based on the machine learning model and the fed 302 input, the components of the braking arrangement 20 are predicted 303, i.e., as part of predicting the at least one component as in action 202. Size, type, and/or manufacturer of any of the components may be predicted. The predicted 303 components are at least partly indicated in a message to the server 100.

Based on the predicted components, it is detected 304, whether or not a change in any of the components of the braking arrangement 20 has occurred, e.g., as part of action 203. The detection may be based on locally stored information and/or may be indicated by a message from the server 100.

When it is detected 304 that a change in any of the components of the braking arrangement 20 has occurred, updated parameters, i.e., a new configuration, for the braking arrangement 20 is retrieved from the server 100, e.g., as in action 204.

Using the updated configuration, the vehicle 10 may continue to use the trained machine learning model to detect further changes to components in the braking arrangement 20, i.e., as in action 201 and/or 301. In some embodiments, the continuation to detect further changes to components in the braking arrangement 20 may be triggered by some event in the vehicle 10, triggered periodically, and/or triggered by the server 100.

Confidence Check of Prediction

To verify that the prediction of the at least one component, e.g., as in action 202, is accurate, a confidence check may be performed by verifying an actual deceleration of the vehicle 10 with an expected deceleration of the vehicle 10 when using the at least one component. The expected deceleration may be determined based on the configuration of the braking arrangement before or after the updating of the configuration.

When the confidence check indicates that the prediction is wrong, the prediction of the at least one component, any one or more out of the following may be triggered:
- a new prediction of the at least one component, e.g., as in action 202,
- an alert to a user of the vehicle 10, and
- an emergency stop of the vehicle 10, i.e., braking the vehicle 10 to a stand-still.

Further Information of Training the Trained Machine Learning Model

Training the trained machine learning model, e.g., used in above action 202, may be performed in any suitable manner. In some embodiments, the trained machine learning model is trained with sensor data of the at least one training vehicle, the components of at least one respective braking arrangement of the at least one training vehicle, and a respective configuration of the at least one training vehicle. Typically, multiple training vehicles, components, and configurations are needed for high accuracy. An accuracy may be tested while training the machine learning model and hence, the amount of training data may be suitably selected based on a desired accuracy of the model. The trained machine learning model may for example be trained until an accuracy of a first accuracy threshold, a second accuracy threshold, or a third accuracy threshold is reached.

The first accuracy threshold, e.g., 75% accuracy, may be suitable for a basic version which does not need a lot of training. Training until the first accuracy threshold may only be able to provide warnings and with no closed loop control. The second accuracy threshold, e.g., 85% accuracy, may be suitable for a high performance, e.g., optimum, usage and may be used for a closed loop control. This may require at least a moderate amount of training. The third accuracy threshold, e.g., 95% accuracy, may be suitable for Level 4 (L4) autonomous vehicles.

The configuration of the at least one training vehicle may be predetermined and/or selected by a professional as to represent the ground truth for the machine learning model. The components may be a wide range of components from different manufacturers and/or models in any suitable combination.

The trained machine learning model may comprise a neural network, e.g. which may be built using any suitable tool, e.g., MATLAB, may use of training data from multiple brake components, e.g., as described above with respect to training the trained machine learning model using real-world data and/or simulated sensor data of at least one training vehicle comprising the at least one component.

The training data may, as an example, comprise sensor data indicative of different brake chambers. A model development of the trained machine learning model, i.e., a training phase, may be performed at any suitable time, e.g., typically prior to manufacturing the vehicle 10. Once the training data is obtained, training the trained machine learning model may comprise tuning the trained machine learning model using any one or more out of the models and/or methods listed and described in action 202.

The trained machine learning model may be a real-time prediction model and may be installed, e.g., during manufacturing of the vehicle 10 inside an ECU, e.g., the control unit 70. The trained machine learning model may be updated with new training data at any suitable time.

Improving Prediction Accuracy

The type of sensor data used for training the trained machine learning model and/or for use as input to the trained machine learning model, e.g., as in actions 201-202, may result in different accuracies in predicting the at least one component, e.g., as in action 202.

For a high accuracy in predicting the at least one component, e.g., as in action 202, the following first priority sensor data may be arranged to be part of the training data for training the machine learning model and/or the obtained sensor data in action 201:
- a brake pedal position,
- a delivery line pressure,
- a wheel rotational speed of at least one wheel,
- a rolling radius of at least one wheel, and
- a vehicle deceleration.

In some embodiments, high accuracy can be achieved by using all of the first priority sensor data for training the trained machine learning model while only using a subset of the first priority for using the trained machine learning model, i.e., when obtaining the sensor data and predicting the at least one component as in actions 201-202.

For further accuracy in predicting the at least one component, e.g., as in action 202, the following second priority sensor data may be arranged to be part of the training data for training the machine learning model and/or the obtained sensor data in action 201:
- at least one temperature measurement of at least one brake of the braking arrangement,
- at least one ambient temperature of the braking arrangement and/or of the vehicle,
- a control line pressure,
- a speed of the vehicle, In some embodiments, it may be possible to further improve accuracy of predicting the at least one component, e.g., as in action 202. This may be performed by training the trained machine learning model using extended vehicle information indicating any one or more out of:
- a tire wear of at least one wheel,
- a wheel alignment of at least one wheel,
- a tire stiffness for at least one wheel, and/or
- an inverse tire model for at least one wheel e.g., the inverse tire model being any suitable tire model, e.g., Pacejka and/or brush model, which may be performed in reverse for training as what is normally the output of these models may be obtained, e.g., by one or more sensors.

The extended vehicle information may at least partly affect sensor data of a vehicle, e.g., the vehicle 10 and/or the at least one training vehicle. The accuracy of the prediction of the at least one component is therefore improved as the trained machine learning model comprises more distinguishing information of different vehicles which may affect its respective sensor data. In these embodiments, corresponding sensor data is obtained for the vehicle 10, e.g., as in action 201, and prediction of the at least one component, e.g., as in action 202, is further based on the extended vehicle information.

To perform the method actions, examples, and/or embodiments described herein, the control unit 70 may be configured to update a configuration of the braking arrangement 20 in the vehicle 10.

The control unit 70 may further be configured to perform any one or more of the above actions 201-204 or any of the other examples and/or embodiments herein. The control unit 70 may be arranged in any suitable location, e.g., in the vehicle 10 and/or in the braking arrangement 20. The control unit 70 may be an ECU. The control unit 70 may for example comprise an arrangement depicted in FIGS. 4A and 4B.

Figure 4A:
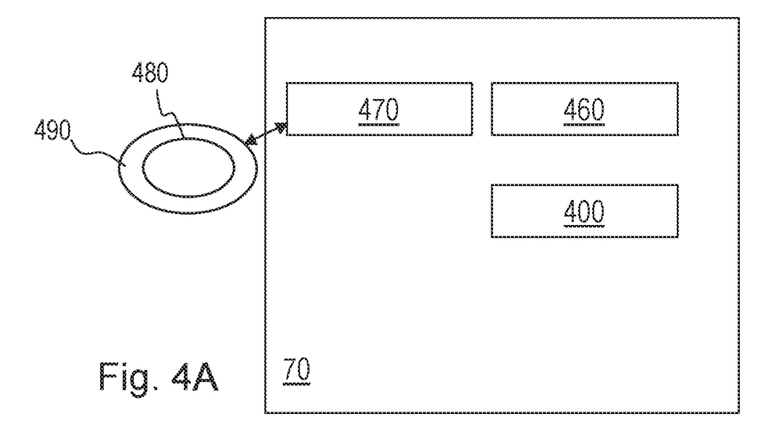
FIGS. 4A-4B are schematic block diagrams illustrating a control unit in accordance with embodiments herein.
Figure 4B:
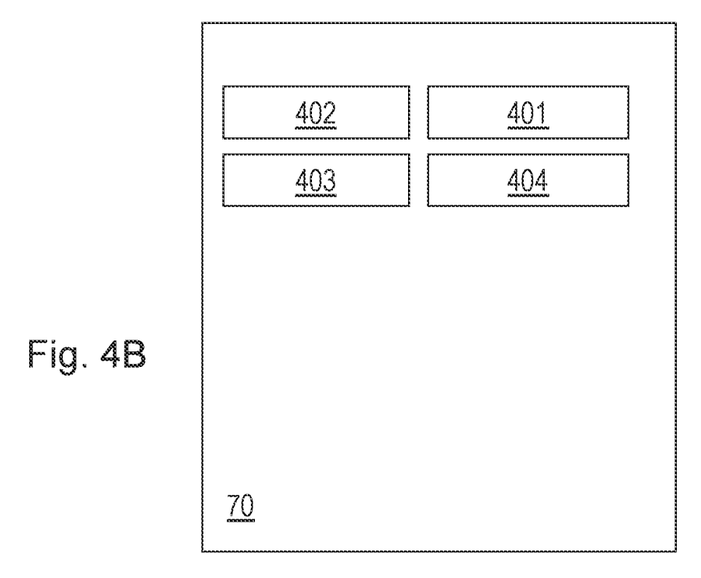

The control unit 70 may comprise an input and output interface 400 configured to communicate with any necessary components and/or entities of embodiments herein. The input and output interface 400 may comprise a wireless and/or wired receiver (not shown) and a wireless and/or wired transmitter (not shown). The control unit 70 may use the input and output interface 400 to control and/or communicate with sensors, e.g. the set of sensors, the trained machine learning model, the braking arrangement 20, actuators, subsystems, and interfaces in the vehicle 10 by using any one or more out of: Controller Area Network (CAN), ethernet cables, Wi-Fi, Bluetooth, and/or other network interfaces.

The control unit 70 may be configured to, e.g., by means of an obtaining unit 401 in the control unit 70, obtain sensor data indicative of a status of the vehicle 10 and/or of the braking arrangement during at least a part of a braking operation performed by the braking arrangement 20.

The control unit 70 may be configured to, e.g., by means of a predicting unit 402 in the control unit 70, based on the obtained sensor data, predict at least one component that are part of the braking arrangement 20.

The control unit 70 may be configured to, e.g., by means of a detecting unit 403 in the control unit 70, detect that the configuration of the braking arrangement 20 does not comply with the at least one component.

The control unit 70 may be configured to, e.g., by means of an updating unit 404 in the control unit 70, in response to detecting that the configuration of the braking arrangement 20 does not comply with the at least one component, update the configuration to be based on the at least one component.

The embodiments herein may be implemented through a processor or one or more processors, such as a processor 460 of a processing circuitry in the control unit 70 depicted in FIG. 4A, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 470 comprising one or more memory units. The memory 470 comprises instructions executable by the processor in control unit 70. The memory 470 is arranged to be used to store e.g., information, indications, data, configurations, sensor data, positioning information, and applications to perform the methods herein when being executed in the control unit 70.

In some embodiments, a computer program 480 comprises instructions, which when executed by a computer, e.g., the processor 460, cause the at least one processor of the control unit 70 to perform the actions 201-204 above.

In some embodiments, a computer-readable storage medium 490 comprises the respective computer program 480. The computer-readable storage medium 490 may comprise program code for performing the steps of any one of actions 201-204 above when said program product is run on a computer, e.g., the processor 460.

Those skilled in the art will appreciate that the units in the control unit 70 described above may refer to a combination of analogue and digital circuits, and/or one or more processors configured with software and/or firmware, e.g., stored in the control unit 70, that when executed by the respective one or more processors such as the processor 460 described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present invention is not limited to the embodiments described above and illustrated in the drawings; rather, the skilled person will recognize that many changes and modifications may be made within the scope of the appended claims. Furthermore, all above embodiments and/or examples may be combined in any suitable manner.

The invention claimed is:

1. A method for updating a configuration of a braking arrangement in a vehicle, the method comprising:
   obtaining, by a control unit, sensor data indicative of a status of the vehicle and/or of the braking arrangement during at least a part of a braking operation performed by the braking arrangement,
   based on the obtained sensor data, predicting, by the control unit, at least one component that is part of the braking arrangement, wherein predicting the at least one component comprises predicting at least one of a model of the at least one component, an identifier of the at least one component, and a manufacturer of the at least one component,
   in response to detecting that the configuration of the braking arrangement does not comply with the at least one component, updating, by the control unit, the configuration to be based on the at least one component, and
   operating, by the control unit, the at least one component based on the updated configuration.

2. The method of claim 1, wherein the sensor data indicates any one or more out of:
   at least one temperature measurement of at least one brake of the braking arrangement,
   at least one ambient temperature of the braking arrangement and/or of the vehicle,
   a brake pedal position,
   a control line pressure,
   a delivery line pressure,
   a rotational speed of at least one wheel,
   a speed of the vehicle,
   a rolling radius of at least one wheel, and
   a deceleration measurement of the vehicle.

3. The method of claim 1, wherein predicting the at least one component further comprises predicting
   at least one type of the at least one component.

4. The method of claim 1, wherein the configuration comprises a brake factor parameter for at least one wheel, and wherein the brake factor parameter is indicative of a torque generated per unit of brake pressure.

5. The method of claim 1, wherein updating the configuration comprises obtaining a new configuration or obtaining an adjustment to the configuration from a server.

6. The method of claim 1, wherein detecting that the configuration of the braking arrangement does not comply with the at least one component comprises determining that the configuration is not configured for the at least one component.

7. The method of claim 1, wherein predicting the at least one component comprises determining a confidence level for the predicted the at least one component, and wherein detecting that the configuration of the braking arrangement does not comply with the at least one component comprises determining that the confidence level exceeds a threshold.

8. The method of claim 1, wherein predicting the at least one component is performed by using a trained machine learning model and using the obtained sensor data as input.

9. The method of claim 8, wherein the trained machine learning model is trained using real-world data and/or simulated sensor data of at least one training vehicle comprising the at least one component.

10. The method of claim 1, wherein predicting the at least one component that are part of the braking arrangement is at least partly triggered periodically and/or by any one or more out of:

receiving a signal from a server,
obtaining input from a user, and
starting the vehicle.

11. The method of claim 1, wherein the sensor data is obtained during at least one complete brake cycle of the braking arrangement.

12. A control unit configured to perform the method of claim 1.

13. A vehicle comprising a braking arrangement and the control unit of claim 12.

14. A computer program product comprising program code for performing, when executed by a computer, the steps of claim 1.

15. A non-transitory computer readable medium comprising a computer program comprising program code, which when executed by a computer, performs the steps of claim 1.

* * * * *